Feb. 19, 1952    L. S. SMATHERS    2,586,269
WATER-PRESSURE BEARING
Filed Feb. 24, 1947    3 Sheets-Sheet 2
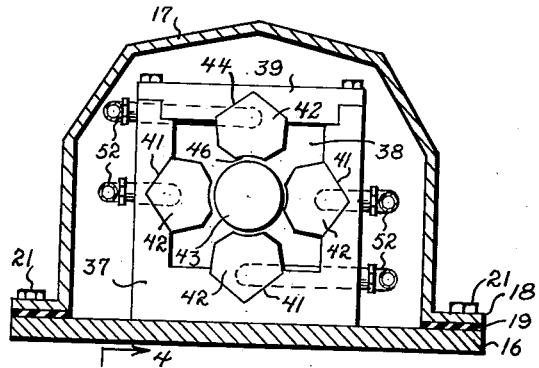
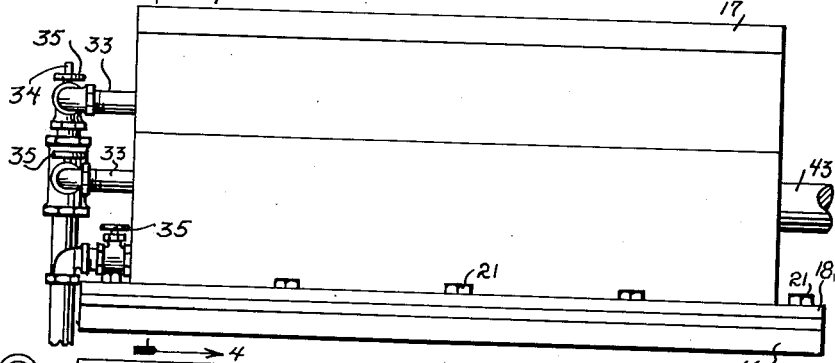
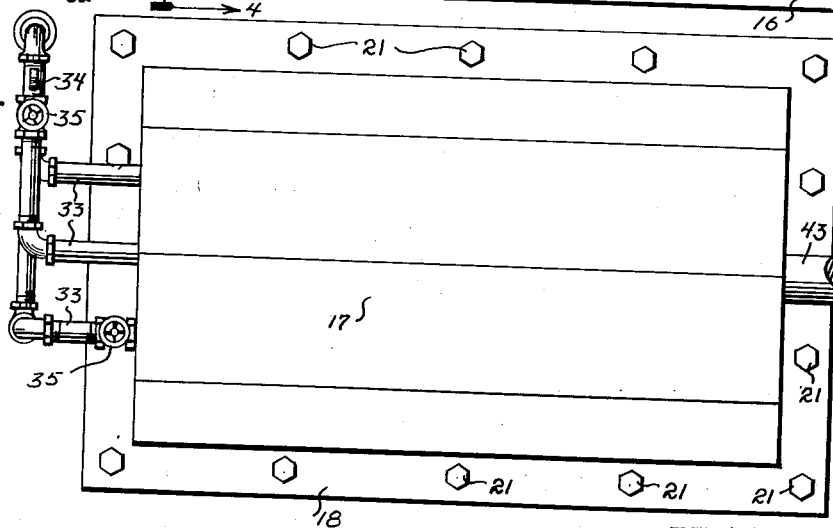
INVENTOR.
LAWRENCE S. SMATHERS
BY *Victor J. Evans & Co.*
ATTORNEYS Feb. 19, 1952 L. S. SMATHERS 2,586,269
WATER-PRESSURE BEARING
Filed Feb. 24, 1947 3 Sheets-Sheet 3
FIG_5_
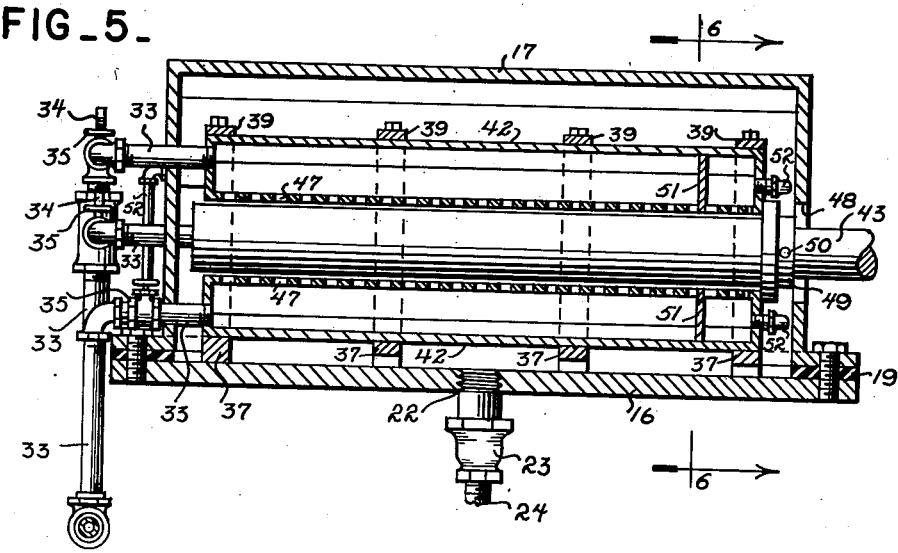
FIG_6_
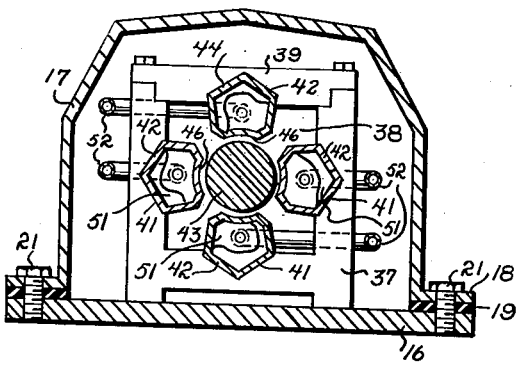
FIG_7_
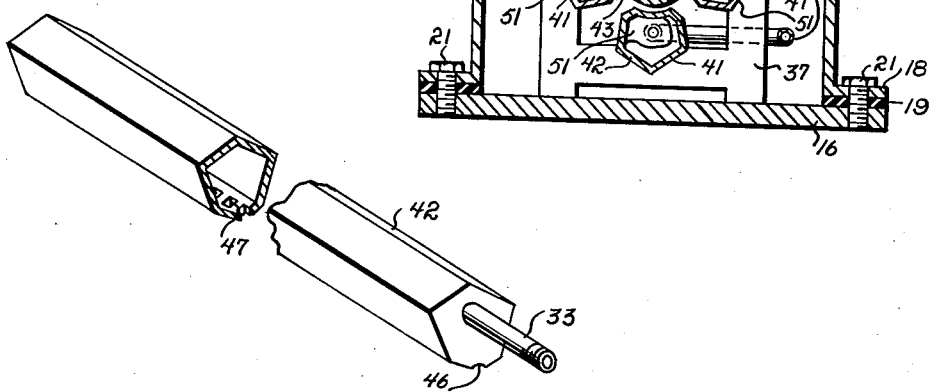
INVENTOR.
LAWRENCE S. SMATHERS
BY *Victor J. Evans & Co.*
ATTORNEYS Patented Feb. 19, 1952

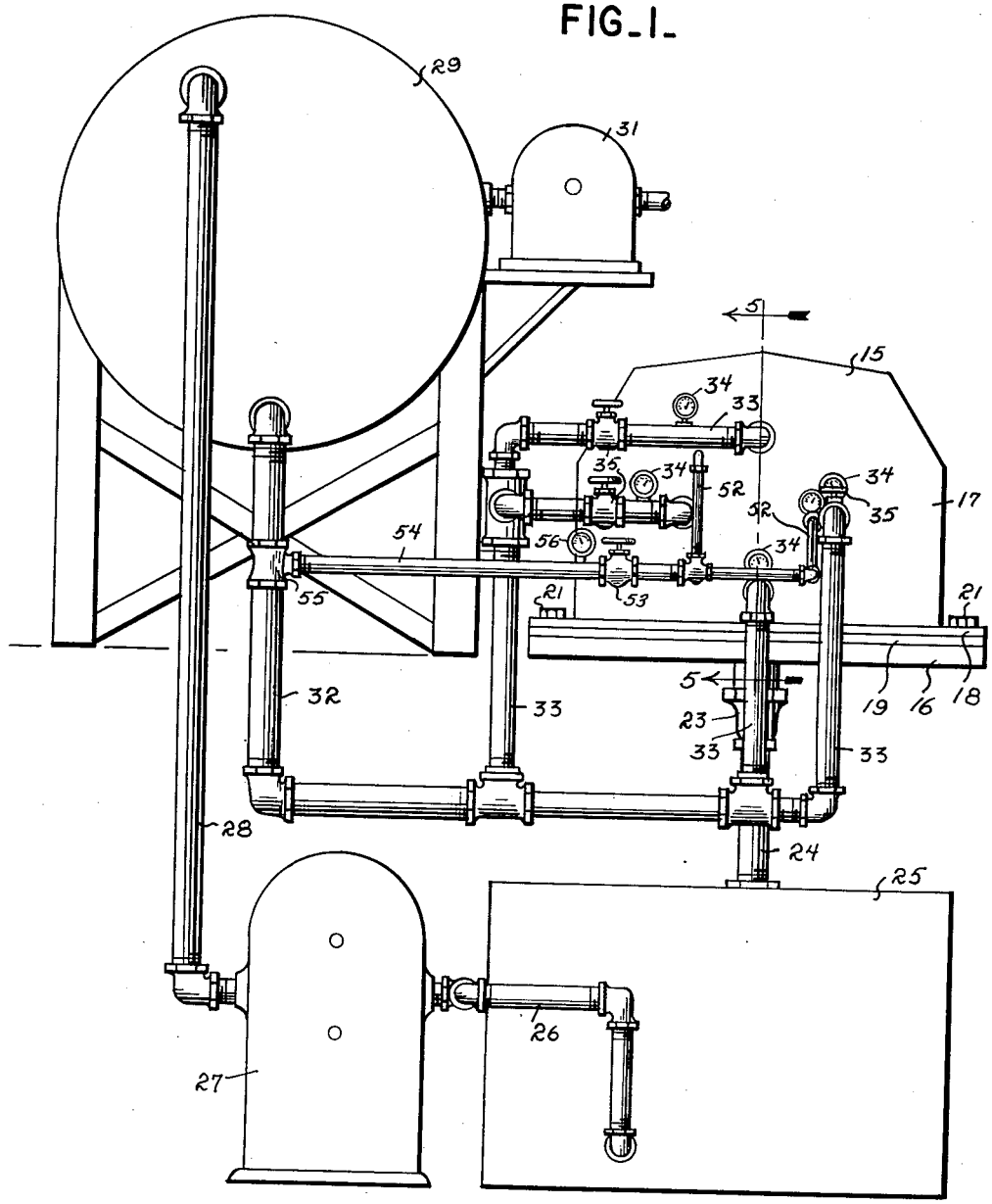

2,586,269

UNITED STATES PATENT OFFICE 2,586,269

WATER-PRESSURE BEARING

Lawrence Sebastian Smathers, Leeper, Pa.

Application February 24, 1947, Serial No. 730,644

1 Claim. (Cl. 308—9)

This invention relates to fluid bearings wherein the shaft journalled within the bearing is supported in volumes of water or other fluid under pressure.

It is an object of the present invention to provide a fluid bearing with a simple and effective fluid supply system wherein fluid to the nozzle blocks can be easily controlled so as to maintain an equal pressure in all of the nozzle blocks.

Another object of the present invention is to sectionalize the nozzle blocks of the fluid bearing so that pressures can be delivered to the sectionalized portions of the blocks differing from the pressure delivered by the main delivery pipe to the main portions of the nozzle blocks.

Other objects of the present invention are to provide a simple fluid bearing, which is inexpensive to manufacture, and which is efficient in operation.

For a better understanding of the invention reference may be had to the following detailed description, taken in connection with the accompanying drawing, in which Fig. 1 is a front elevational view of the fluid supply arrangement connected to one end of the bearing and maintaining the pressure within the bearing, Fig. 2 is a side elevational view of the bearing, Fig. 3 is a top plan view of the bearing, Fig. 4 is a transverse cross-sectional view of the bearing taken on line 4—4 of Fig. 2 and looking in the direction of the arrows thereof, Fig. 5 is a longitudinal cross-sectional view taken on line 5—5 of Fig. 1 and looking in the direction of the arrows thereof, Fig. 6 is a transverse cross-sectional view taken on line 6—6 of Fig. 5 and looking in the direction of the arrows thereof and looking within the sectionalized portions of the nozzle block, Fig. 7 is a perspective view of one of the nozzle blocks removed from the bearing housing.

Referring now to the figures, 15 represents a fluid bearing embodying the features of the present invention and which comprises a base 16 and a casing 17 with a base flange 18 by which the casing 17 is connected to the base 16 and a cushioning gasket 19 thereon by attached bolts 21. Extending through the bottom of the base 16 is a threaded opening 22 with which a coupling 23 engages for draining off water or other liquid from the bearing and conducting it through a pipe 24 to a reservoir 25. From the reservoir 25 and through a pipe connection 26 water is caused to be moved by a pump 27 and passed to an upwardly extending pipe 28 for delivery to a high pressure water tank 29. An air compressor 31 maintains a high pressure in the top of the water tank 29 so that water will be put under a pressure of fifty or more pounds per square inch. From the bottom of the tank 29, the water is forced under pressure to a delivery pipe 32 to which are connected four distributing pipes 33 which enter the bearing casing 17 at equally spaced distances apart on the front of the bearing casing. Each of these pipes 33 has a pressure gauge 34 and may have a throttling valve 35.

Within the casing 17 are a number of open heavy frames as indicated at 37 and the frames are fixed to the bottom wall of the casing in spaced relation to each other. The opening in each frame is indicated at 38 to which access may be gained by removal of a top bar 39. Each frame 37 has on the inner walls of each of its sides a groove 41 into which an elongated tubular nozzle 42 is extended so as to be properly supported in radial alignment with a shaft 43 to be supported by the fluid extended from the nozzles 42. Also the top plate 39 is similarly grooved as shown at 44 to retain the fourth nozzle bar 42. Each nozzle 42 has closed ends and the pipe 33 extends from one closed end thereof. The portion of the nozzle block facing the bearing surface is preferably concave in cross section as indicated at 46 to coact the convex surface of the shaft 43. Wells 47 extend through this curved portion 46 at longitudinally spaced distances along the nozzle. The shaft extends through an opening 48 in one end of casing 17 and is retained against axial displacement within the frames 37 by engagement of a collar 49 with one of the outermost frames 37. The collar 49 being fixed to the shaft by a set screw 50. The nozzles 42 are spaced from the shaft 43 radially and longitudinally thereof and the distance between the opposing nozzles is slightly greater than the diameter of the shaft 43. Thus the shaft is at no time in contact with the nozzles.

Each nozzle has at the collar end of the shaft 43 a partition wall 51 to sectionalize the space within the nozzle and to which water under pressure can be delivered through side pipes 52 extending into the casing 17 along with pipes 33 and the fluid therein is arranged to be controlled by a throttle valve 53 in a delivery pipe 54 extending from a coupling 55 in the main delivery pipe 32. By this means the fluid pressures acting upon the shaft by the different nozzle devices can be equalized. A pressure gauge 56 is located in the pipe 54 and can be observed while operating the throttle valve 53.

While various changes may be made in the detailed construction it shall be understood that such changes shall be in the spirit and scope of the present invention as defined by the appended claim.

I claim:

A fluid bearing comprising a casing, a number of heavy open frames within the casing, each of said frames having three integral walls and a removable bar forming a fourth wall, grooves within the interior wall surfaces of each frame, a number of nozzles extending longitudinally of the frames and extending into the grooves in the walls of the frames and retained within the grooves of the same, each of said nozzles having a partition wall therein extending transversely thereof to sectionalize a portion of the space within each nozzle, each of said nozzles having a concave inner face, a plurality of relatively spaced openings in each of said inner faces, means for separately supplying the sectionalized spaces with fluid under pressure and in a radial direction, a shaft extending into the casing and through the frames longitudinally thereof, said shaft coacting with the concave inner face of each nozzle but spaced therefrom, said shaft being supported by the fluid being forced from the openings in the inner face of each nozzle, means for supplying fluid under pressure to each nozzle, and throttle control means for controlling the pressure of the fluid being delivered to the sectionalized spaces.

LAWRENCE SEBASTIAN SMATHERS.

REFERENCES CITED

The following references are of record in the file of this patent:

UNITED STATES PATENTS

| Number | Name | Date |
|---|---|---|
| 466,645 | Wood | Jan. 5, 1892 |
| 1,499,332 | Baumann | July 1, 1924 |
| 1,906,715 | Penick | May 2, 1933 |
| 2,049,343 | Warren | July 28, 1936 |
| 2,203,039 | Aker | June 4, 1940 |

FOREIGN PATENTS

| Number | Country | Date |
|---|---|---|
| 244,539 | Italy | 1927 |